July 22, 1924.

J. C. DANZIGER

STEERING WHEEL

Filed July 3, 1922

Inventor
Jacob Carl Danziger

By Whittemore Hulbert Whittemore Belknap

Attorneys

July 22, 1924.

J. C. DANZIGER

STEERING WHEEL

Filed July 3, 1922

Inventor
Jacob Carl Danziger

Attorneys

Patented July 22, 1924.

1,502,020

UNITED STATES PATENT OFFICE.

JACOB CARL DANZIGER, OF DETROIT, MICHIGAN, ASSIGNOR TO DETROIT MOTOR CASTINGS COMPANY, OF DETROIT, MICHIGAN, A CORPORATION OF MICHIGAN.

STEERING WHEEL.

Application filed July 3, 1922. Serial No. 572,682.

*To all whom it may concern:*

Be it known that I, JACOB CARL DANZIGER, a citizen of the United States of America, residing at Detroit, in the county of Wayne and State of Michigan, have invented certain new and useful Improvements in Steering Wheels, of which the following is a specification, reference being had therein to the accompanying drawings.

The invention relates to steering wheels of motor vehicles and refers more particularly to mechanisms for locking steering wheels in inoperative position. One of the objects of the invention is the provision of a locking member which is non-rotatably secured to the steering wheel and is adjustable into engagement with a cooperating member secured upon the steering wheel post, whereby the locking member is held from rotation, means being provided for locking the locking member in engagement with the cooperating member. Other objects are the provision of means for yieldably moving the locking member to normal operative position upon release of the locking means, which is again engageable with the locking member to hold the same in operative position; the arrangement of the locking member to inclose the means for securing the steering wheel to the steering wheel shafts, thereby preventing the unauthorized removal of the steering wheel and lock from the shaft; the provision of a member cooperating with the locking member and adapted to be readily secured to the lever quadrant upon the post; and the provision of means insertable within the steering wheel hub block for protecting the lock, which latter is engageable with the locking member, this protecting means being held in the hub block by the cooperating member secured to the lever quadrant. Further objects of the invention reside in the novel features of construction and combinations and arrangements of parts as more fully hereinafter set forth.

Figure 1:
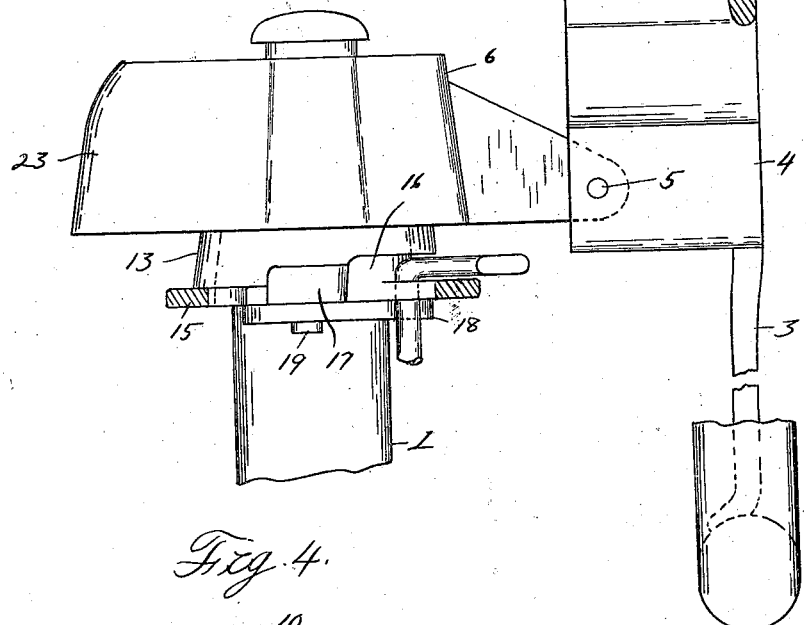
Figure 1 is a side elevation of a steering wheel embodying my invention.
Figure 4:
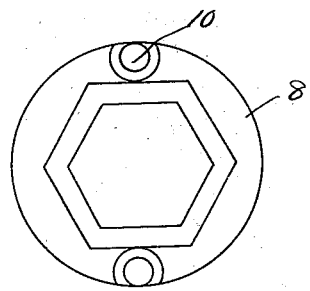
Figure 4 is a bottom plan view of the locking member.
Figure 2:
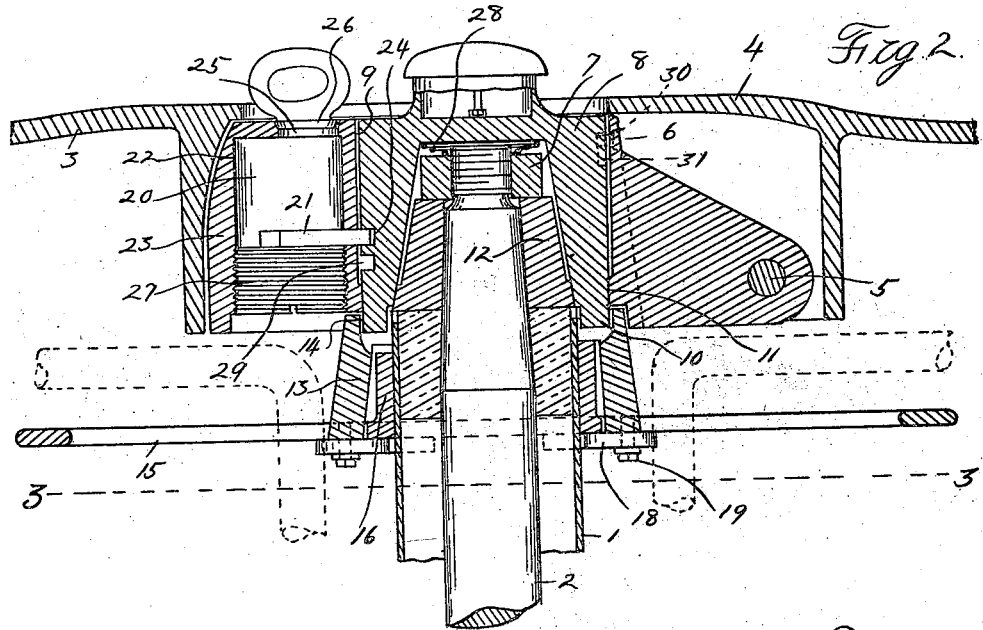
Figure 2 is a transverse section therethrough.
Figure 3:
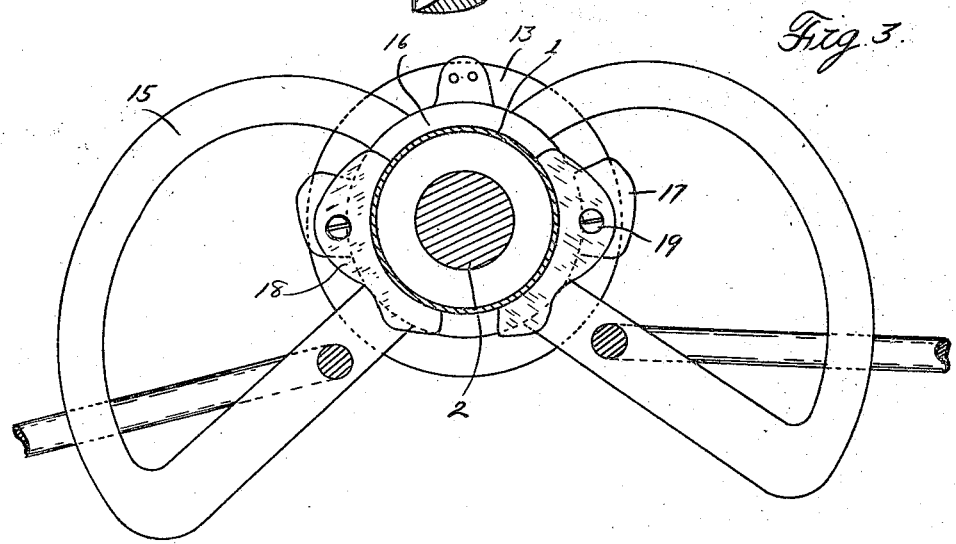
Figure 3 is a cross section on the line 3—3 of Figure 2.

1 is the steering wheel post, and 2 the shaft extending upwardly therewithin and beyond its upper end, the post being stationary and the shaft rotatable. The steering wheel comprises the spider 3 having the cap 4 pivoted at 5 to the hub block 6 over which the cap is engageable. The hub block is non-rotatably secured upon the upper end of the shaft 2 and is secured in place by the nut 7.

To lock the steering wheel from rotation, thereby locking the shaft 2 from rotation, I have provided the locking member 8 movable axially of the post 1 and engaging in an axial recess 9 formed in the hub block and provided with depending lugs 10 adapted to extend through apertures 11 in the bottom wall of the recess. This locking member is cup-shaped and incloses the central boss 12 of the hub block, and also the nut 7 which abuts the upper end of the boss. The outer face of the boss is polygonal and preferably tapered upwardly, and the inner face of the locking member has a corresponding polygonal shape to engage over the boss, the arrangement being such that the locking member has a non-rotatable but sliding engagement with the hub block. 13 is a member secured to the post 1 and provided with recesses 14 in its upper end for engagement in by the depending lugs 10 of the locking member 8 when the latter has been adjusted downwardly or inwardly, thereby locking the locking member from rotation, and consequently locking the steering wheel hub block, steering wheel, and the steering wheel shaft from rotation.

As specifically shown, the cooperating member 13 is secured to the lever quadrant 15 having a boss 16 fixed upon the steering wheel post 1. This cooperating member is cup-shaped to surround the boss 16 and has the depending lugs 17, the lower faces of which are substantially flush with the lower face of the lever quadrant. Suitable arcuate dogs 18 are secured to the lower faces of these depending lugs by suitable means such as the screw bolts 19, these dogs engaging the lower face of the lever quadrant and extending partially around the post 1. A portion of the side of the cup-shaped member is cut away to provide sufficient clearance for operating the levers engaging the quadrant.

To lock the locking member 8 in its lowered or inner position with its depending lugs 10 in engagement with the recesses 14 of the cooperating member 13, I have provided the key-actuated lock 20 having the rotatable latch 21. This lock is insertable upwardly in a bore 22 located in an enlargement 23 in the hub block and the latch is movable through an aperture in the inner portion of the wall forming the bore and into engagement with the upper horizontal slot 24 formed in the outer face of the locking member. A suitable guard 25 is provided between the lock and the key opening 26 at the upper end of the bore.

To protect the lock, the plug 27 is provided insertable upwardly within the bore 22 and threadedly engaging its lower end, this plug being adapted to abut the lower end of the lock and being held in the bore by the cooperating member 13, the upper end of which overlaps the plug and consequently prevents its removal.

For automatically moving the locking member 8 upwardly or outwardly from inoperative position to operative position upon release of the lock, there is the coil spring 28 between the nut 7 and the upper end of the locking member. However, for the purpose of preventing accidental downward or inward movement of the locking member into locking position, the latch 21 of the lock 20 is rotatable into engagement with the lower horizontal slot 29 formed in the outer face of the locking bolt.

For the purpose of holding the locking member 8 in engagement with the hub block 6, I have provided the set screw 30 threadedly engaging the hub block and extending into the vertical slot 31 in the outer face of the locking member, the slot being of sufficient length to permit of the necessary movement of the locking member from operative to inoperative positions, but cooperating with the set screw to limit the movement of the locking member in either direction, and particularly in an upward or outward direction, beyond its positions in which it may be locked.

From the above description, it will be readily seen that I have provided a tiltable steering wheel having mechanism for rigidly locking the same from rotation. Also, this mechanism includes a locking member which encloses the nut for securing the steering wheel to the shaft and prevents the unauthorized removal of the steering wheel and lock from the same. Furthermore, the locking member is adjustable downwardly or inwardly into inoperative position and automatically movable upwardly or outwardly into operative position, a lock being engageable with the locking member in each of its positions.

What I claim as my invention is:

1. The combination with a steering wheel post and rotatable shaft, and a steering wheel having a spider cap adapted for rotating with said shaft, of an adjustable locking member non-rotatably mounted and manually depressible in the spider cap of said steering wheel, means upon said post with which said locking member is engageable by depression for holding said locking member from rotation, and means for locking said locking member when in engagement with said holding means.

2. The combination with a steering wheel post and rotatable shaft, and a steering wheel secured to said shaft, of a longitudinally movable locking member non-rotatably secured to said steering wheel, means upon said post with which said locking member is engageable upon adjustment in one direction for holding said locking member from rotation, means shiftable at an angle to the axis of said shaft for locking said locking member when in engagement with said means, and means for automatically moving said locking member in the opposite direction to disengage the same from said holding means upon releasing said locking means, said locking means also locking said locking member when disengaged from said holding means.

3. The combination with a steering wheel post and rotatable shaft, and a steering wheel having a spider cap adapted for rotating said shaft, of a locking member having the greater part thereof below the spider of said steering wheel and movable axially of said post, means upon said post with which said locking member is engageable upon inward movement for holding said locking member from rotation, and means for locking said locking member when in engagement with said holding member.

4. The combination with a steering wheel post and rotatable shaft, and a steering wheel upon said shaft, of a locking member inclosing the upper end of said shaft and non-rotatably secured to said steering wheel and movable axially of said post, means upon said post with which said locking member is engageable upon inward movement for holding said locking member from rotation, means for yieldably moving said locking member out of engagement with said holding means, and locking means engageable with said locking member to lock the same in engagement and out of engagement with said holding means.

5. The combination with a steering wheel post and rotatable shaft, a steering wheel non-rotatably mounted upon said shaft, and means for securing said steering wheel upon said shaft, of an adjustable locking member non-rotatably secured to said steering wheel and inclosing said securing means, means upon said post with which said locking member is engageable for holding said locking member from rotation, and laterally shiftable means for locking said locking member when in engagement with said holding means.

6. The combination with a steering wheel post and rotatable shaft, a lever quadrant upon said post, and a steering wheel having a spider upon said shaft above said lever quadrant, of an adjustable locking member non-rotatably mounted in the spider of said steering wheel, a cooperating member secured to said lever quadrant with which said locking member is engageable and adapted to be engaged by said locking member and hold the same from rotation, and means for locking said locking member when in engagement with said cooperating member.

7. The combination with a steering wheel post and rotatable shaft, and a steering wheel hub block upon said shaft, of a locking member non-rotatably secured to said hub block and movable axially of said post, means upon said post with which said locking member is engageable for holding said locking member from rotation, a lock insertable within said hub block and provided with a latch for engagement with said locking member to hold the same when in engagement with said holding means, and a plug insertable within said hub block and adapted to abut said lock, said holding means locking said plug to prevent its removal.

In testimony whereof I affix my signature.

JACOB CARL DANZIGER.